(12) United States Patent
Bruyere

(10) Patent No.: US 9,124,202 B2
(45) Date of Patent: Sep. 1, 2015

(54) CONFIGURATION OF A STATOR OF A ROTATING ELECTRIC MACHINE

(75) Inventor: Antoine Bruyere, Evecquemont (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 519 days.

(21) Appl. No.: 13/531,931

(22) Filed: Jun. 25, 2012

(65) Prior Publication Data

US 2012/0326666 A1  Dec. 27, 2012

(30) Foreign Application Priority Data

Jun. 24, 2011  (FR) ...................... 11 55602

(51) Int. Cl.
   H02J 7/00      (2006.01)
   H02P 6/08      (2006.01)
   H02J 7/02      (2006.01)
   H02J 7/14      (2006.01)
   B60L 11/14     (2006.01)
   H02K 3/28      (2006.01)

(52) U.S. Cl.
   CPC ............... H02P 6/085 (2013.01); B60L 11/14 (2013.01); H02J 7/022 (2013.01); H02J 7/14 (2013.01); H02J 7/1415 (2013.01); B60L 2220/54 (2013.01); B60L 2220/56 (2013.01); H02K 3/28 (2013.01); H02K 2213/09 (2013.01); Y02T 10/641 (2013.01); Y02T 10/642 (2013.01); Y02T 10/70 (2013.01); Y02T 10/7005 (2013.01); Y02T 10/7077 (2013.01)

(58) Field of Classification Search
   USPC .................................................. 320/104–110
   See application file for complete search history.

(56) References Cited

U.S. PATENT DOCUMENTS

2010/0027305 A1* 2/2010 Oyobe et al. .................. 363/131
2010/0213896 A1* 8/2010 Ishii et al. ..................... 320/109

FOREIGN PATENT DOCUMENTS

| WO | 97/02649 A1    | 1/1997 |
| WO | 2010/057892 A1 | 5/2010 |
| WO | 2010/057893 A1 | 5/2010 |

OTHER PUBLICATIONS

French Search Report issued in the corresponding French application No. 1155602, mailing date Feb. 22, 2012 (2 pages).

*Primary Examiner* — Binh Tat
(74) *Attorney, Agent, or Firm* — Osha Liang LLP

(57) ABSTRACT

Method of configuring a rotating electric machine (1) stator (2), comprising the following steps:
  employing a stator (2) having a carcass (5) on which electrical conductors are coiled so as to form N coils ($6_j$), N being greater than or equal to four and,
  electrically connecting the coils ($6_j$) to an electrical power supply device (7) in such a way that each coil ($6_j$) is traversed by a specific electric current ($i_j$) delivered by the electrical power supply device (7),
the connection of the stator (2) to the electrical power supply device (7) being performed in such a way that as one progresses around the axis (X) of the stator away from a reference coil ($6_1$), the phase shift between the current ($i_1$) traversing the said reference coil and the current ($i_j$) traversing each of the other coils ($6_j$) and specific to the latter varies in a strictly monotonic manner as one progresses.

15 Claims, 2 Drawing Sheets

CONFIGURATION OF A STATOR OF A ROTATING ELECTRIC MACHINE

Figure 1:
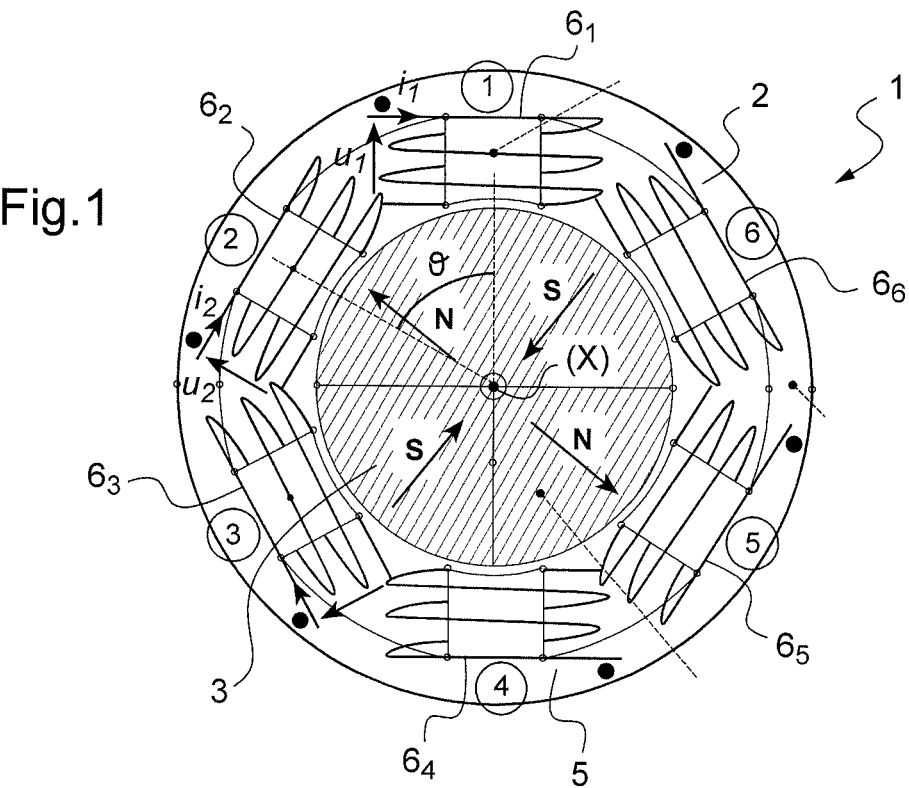

The subject of the present invention is a method of configuring a rotating electric machine stator, a method of charging a battery of an electric vehicle comprising a rotating electric machine having a stator thus configured and the system formed by such a stator and the electrical power supply device to which it is connected.

The invention applies to any type of rotating electric machine, especially but not exclusively to synchronous or asynchronous machines.

Rotating electric machines comprise a stator having a carcass on which are coiled electrical conductors forming the coils of the stator. These electric machines may be used for the propulsion of hybrid or electric vehicles. Such vehicles then comprise a battery serving to supply power to the electric motor by way of an inverter so as to rotate the former.

During the charging of the battery, the latter may be connected to an electrical power supply device, such as an energy distribution network. It is known, for example from patent application WO 2010/057892, to use the inverter and the coils of the stator during the charging of the battery of the vehicle, so that the same electrical circuit is retained when the battery is powering the motor and when the battery is being recharged.

The order in which the coils are successively arranged on the carcass of a stator as one progresses around the axis of this stator may not comply with the temporal order of the currents traversing each coil. This temporal order of the currents is given by the value of the phase shift between the current traversing a reference coil, to which a zero phase is arbitrarily assigned, and the current traversing each of the other coils of the stator. This temporal order of the currents will subsequently be called the "order of the currents". By way of example, in the case of four regularly phase-shifted currents, the successive currents are ordered as they follow one another around the perimeter of the stator in the following order:
   current of zero phase,
   current phase-shifted with respect to the zero phase current by 90°,
   current phase-shifted with respect to the zero phase current by 180° and,
   current phase-shifted with respect to the zero phase current by 270°.

Now, the way in which the coils arranged on the carcass of the stator are connected to an electrical power supply device influences the behaviour of the rotating electric machine, and especially the control of the latter.

There exists a need to configure a rotating electric machine stator connected to an electrical power supply device so as to improve the operation of the machine, especially to simplify the control of the currents in the coils of the stator of this machine, this possibly turning out to be useful when the electric machine is powered by a battery and when it is desired to recharge the latter.

The aim of the invention is to address this need and this is achieved, according to one of its aspects, with the aid of a method of configuring a rotating electric machine stator, comprising the following steps:
   employing a stator having a carcass on which electrical conductors are coiled so as to form N coils, N being greater than or equal to four and,
   electrically connecting the coils to an electrical power supply device in such a way that each coil is traversed by a specific electric current delivered by the electrical power supply device, the connection of the stator to the electrical power supply device being performed in such a way that as one progresses around the axis of the stator away from a reference coil, the phase shift between the current traversing the said reference coil and the current specific to each of the other coils varies in a strictly monotonic manner as one progresses away from the reference coil.

With such a stator, the order of the coils as one progresses around the axis of the stator is the same as the order of the currents specific to each coil and traversing them or is the inverse order of the order of the currents.

Within the meaning of the invention, a current "specific to a coil" is a current flowing only around the coil in question and not around the other coils of the stator.

This problem was not perceptible in the case where use is made of a rotating electric machine with three coils, powered in three-phase mode. Indeed, in this case, the order of the coils around the axis of the stator necessarily corresponds to the order of the currents or to the inverse order of the currents since, starting from the reference coil traversed by a zero-phase current, are found in succession:
   either the coil having a current that lags by $2\Pi/3$ and the coil whose current lags by $4\Pi/3$, in which case the order of the coils is the same as the order of the currents;
   or the coil having a current that leads by $2\Pi/3$ and then that whose current leads by $4\Pi/3$, in which case the order of the coils is the inverse of the order of the currents.

Thus, the invention allows the coils and the currents to be ordered as one progresses around the axis of the stator, as long as four or more coils are arranged on the carcass of the stator.

The phase shift varies in a strictly monotonic manner, that is to say phase shift between the current traversing the reference coil and the current traversing another coil and specific to the latter is strictly increasing or decreasing as one progresses around the axis of the stator away from the reference coil. Hereinafter, the values of electrical or mechanical angles must be understood to within $2\Pi$.

The coils can be distributed in a uniform manner around the axis of the stator and the phase shift can increase or decrease in a regular manner between the successive coils. "Coils distributed in a uniform manner" signifies that the machine is constructed regularly. In such a case, the angular shift is substantially constant around the perimeter of the stator.

Within the meaning of the invention, the angular shift between two successive coils of the stator may be measured in a plane perpendicular to the axis of the stator, between the median planes of the successive coils. When the stator is tooth-wound, the angular shift between two successive coils may be measured between the median plane of the tooth around which a coil is wound and the median plane of the tooth around which the successive coil is wound.

Two successive coils may be shifted angularly by a mechanical angle substantially equal to $2 \cdot k \cdot \Pi/N$ and the said two successive coils are powered by currents mutually phase-shifted by an electrical angle substantially equal to $2 \cdot k \cdot \Pi/N$. k is a relative integer, being for example equal to one.

Such an angular arrangement of the coils and currents traversing them can make it possible to carry out effective control of the performance of the machine.

The currents delivered by the power supply device can all have the same amplitude.

The coiling step can have been performed prior to the implementation of the method or be part of the method.

The electrical power supply may deliver a polyphase current.

The rotating electric machine may be a synchronous machine, in particular a synchronous machine with permanent magnets.

The coils of the stator may be connected to the electrical power supply device, which is for instance an electrical network, without a voltage converter, notably without a rectifier. The electrical network may be an industrial network managed by an energy supplier or else a more local network, for example of a wind turbine or of an electric-generating set.

According to an exemplary implementation of the invention, the electrical power supply device delivers a three-phase current and it is connected to the coils of the stator in such a way that each coil has an input in current from the power supply device which is common with another coil, the said other coil forming a coil complementary to the said coil. Each coil complementary to a coil will subsequently also be called a "dual coil" for the said coil. Employing a dual coil can allow the currents flowing in a "coil/dual coil" pair to be balanced and the magnetomotive force wave in the air-gap to be static and not create any rotating field, this possibly being useful in applications which will be mentioned hereinafter.

The coiling and the connection may be such that the said coil and the said complementary coil are diametrically opposite with respect to the axis of the stator and are traversed by currents phase-shifted by an electrical angle equal to Π. It is thus possible to obtain for each coil a "coil/complementary or dual coil" pair where the said coils of the pair are diametrically opposite and traversed by currents in phase opposition. When such a stator is associated with a rotor whose diametrically opposite poles have the same polarity (being for example two North poles or two South poles), each coil of a given "coil/dual coil" pair sees strictly the same rotoric magnetic field and then produces a magnetic field in opposition with respect to one another. Thus, the force produced by a coil when it is immersed in the rotoric magnetic field and when it is traversed by a current delivered by the power supply device is compensated by the force produced by its dual coil immersed in the same rotoric magnetic field and traversed by a current in phase opposition, so that the rotor is moving only slightly, or indeed stationary.

As a variant, the stator may be associated with a rotor whose diametrically opposite poles have opposite polarities. Each coil of a pair then sees a rotoric magnetic field in phase opposition, and these coils themselves being traversed by currents in phase opposition, they will generate forces which add together and allow the rotor to be set into rotation. A coil can form a first part of the winding of a phase of the stator while the coil complementary or dual to the said coil forms a second part distinct from the first of the winding of the said phase. The winding of each phase of the stator can thus be made up of a "coil/dual coil" pair.

The current input of the winding of a phase of the stator, which constitutes the common current input of a "coil/dual coil" pair is for example arranged substantially at the midpoint of the said winding, so that the current flowing around a coil has substantially the same amplitude as the current flowing around the coil complementary or dual to the said coil.

The stator may have concentrated or distributed coiling.

The rotor may have smooth poles or salient poles.

The stator and the rotor may or may not comprise the same number of poles.

The electrical power supply device can deliver an AC current. This current can have a frequency of 50 Hz or 60 Hz, for example.

The number of poles of the rotor is for example between 2 and 20.

The subject of the invention is further, according to another of its aspects, a method of charging a battery from an electrical power supply device by using a rotating electric machine, in which method:

the stator of the rotating electric machine is configured by applying the method described hereinabove and, the battery is charged by using the coils of the stator, the currents having flowed around them being rectified before thereafter supplying the battery.

Such a method applies especially in the sector of electric vehicles, especially automobiles, in which the battery can power the motor via an inverter when the latter is rotating and be recharged when the motor is shut down. Other applications of this method are nonetheless possible such as for the generation of hydraulic or wind energy.

Within the meaning of the invention, "battery" must be understood as encompassing one or more batteries which are either batteries designated in this way commercially or other energy storage units, rechargeable or not, such as super-capacitors for example. This may relate to one or more lithium-ion batteries or to accumulators, for example lead accumulators or those of Ni/Cd type.

According to such a method, for example described in patent application WO 2010/057893, the battery of the vehicle can be charged using the elements of the motor and of the inverter such as the coils of the stator of the motor and the switches of the inverter.

The rotating electric machine can in particular comprise a stator powered by a power supply device delivering a three-phase current, the power supply device being linked to the coils of the stator in such a way that each coil has an input in current from the power supply device which is common with another coil of the carcass, the said other coil forming a coil complementary to the said coil, the said coil and the said dual coil being diametrically opposite with respect to the axis of the stator and traversed by currents phase-shifted by an electrical angle equal to Π. The coils of a "coil/dual coil" pair can make up the winding of a phase of the stator and the current input of this winding may be arranged substantially at the midpoint of the said winding.

An inverter comprising switches may be arranged between the stator and the battery. This inverter comprises for example H bridges and each coil can exhibit an output connected between two breaker switches of an arm of an H bridge.

The rotating electric machine can comprise a rotor configured in such a way that the rotor is stationary when the coils of the stator are supplied with current so as to recharge the battery. This stationariness may be obtained by choosing a rotor with diametrically opposite poles of like polarity, in such a way that each "coil/dual coil" pair sees one and the same rotoric magnetic field and generates forces that compensate one another, given that they are traversed by currents in phase opposition. With such an electric machine, it is possible to use the windings of the stator during the charging of the battery while reducing the movements of the rotor as far as possible, so as to obtain a static charger.

This application of the method according to the invention can make it possible to avoid having to decouple the rotor from the shaft of the machine during charging and/or to have to apply brakes to the motor during the charging of the battery.

As a variant, the rotating electric machine can comprise a rotor configured in such a way that the rotor rotates when the coils of the stator are supplied with current during charging.

The subject of the invention is further, according to another of its aspects, a system, comprising:
- a rotating electric machine stator, comprising a carcass and electrical conductors coiled on the carcass so as to form N coils, N being greater than or equal to four, and
- an electrical power supply device delivering a specific electric current to each coil of the stator, the connection of the stator to the electrical power supply device being performed in such a way that as one progresses around the axis of the stator away from a reference coil, the phase shift between the current traversing the said reference coil and the current specific to each of the other coils varies in a strictly monotonic manner as one progresses away from the said reference coil.

As one progresses around the axis of the stator, two successive coils may be shifted angularly by a mechanical angle substantially equal to $2 \cdot k \cdot \Pi/N$ and the said successive coils may be connected to the network so as to be respectively powered by currents mutually phase-shifted by an electrical angle substantially equal to $2 \cdot k \cdot \Pi/N$. k is a relative integer, for example equal to one.

Such a system can make it possible to obtain the advantages mentioned hereinabove and can be associated with all or some of the characteristics mentioned hereinabove in relation to the methods described.

Figure 2:
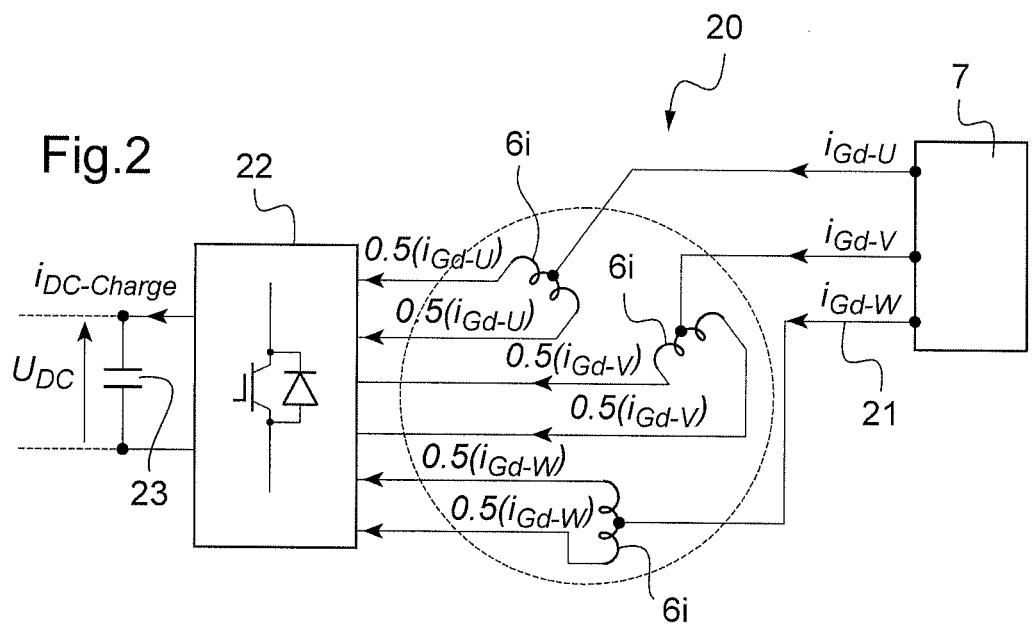
Figure 3:
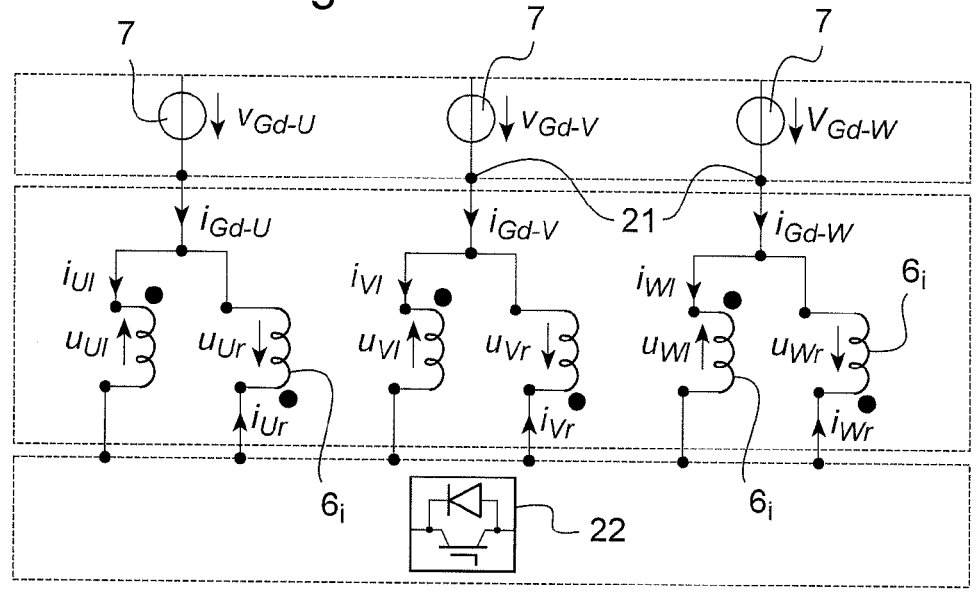
Figure 4:
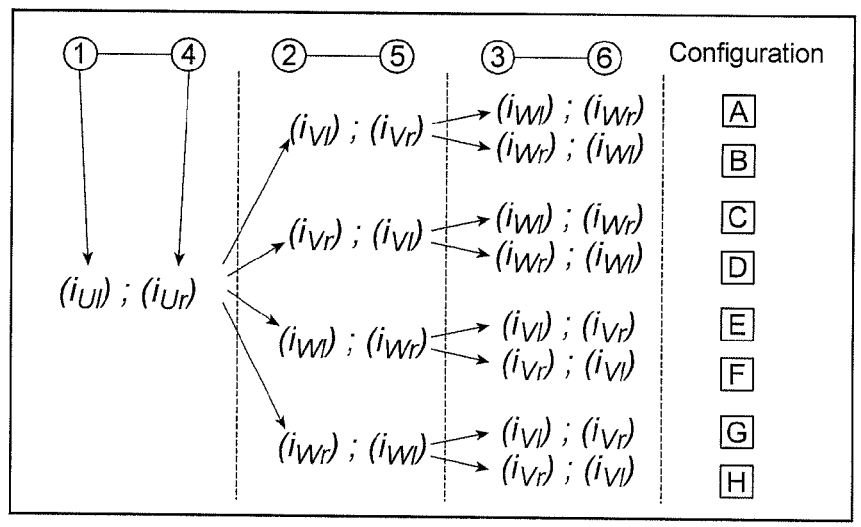

The invention may be better understood on the following reading of nonlimiting exemplary implementations of the latter and on examining the appended drawing in which, FIG. 1 represents in a schematic manner a rotating electric machine having a stator configured in accordance with the method according to the invention, FIGS. 2 and 3 represent a sub-assembly of an electric vehicle in which a method of charging a battery with the aid of a stator configured according to the invention may be implemented and, FIG. 4 is a chart showing the various possibilities of connecting the coils of the stator of the motor represented in FIGS. 2 and 3 to an electrical power supply device.

Represented in FIG. 1 is a rotating electric machine 1 whose stator 2 is configured in accordance with the method according to the invention. This rotating electric machine 1 is for example a synchronous or asynchronous machine and can exhibit a nominal power of between 10 W and 10 MW, especially of between 100 W and 200 kW.

The machine 2 comprises a rotor 3 which in the example considered has four poles. In the case of a synchronous machine rotor, the rotor 3 can comprise permanent magnets.

The stator 2 comprises a carcass 5 on which are arranged N coils $6_j$, N being greater than or equal to four. In the example considered, N is equal to six. The carcass 5 extends around an axis X which is subsequently called the "axis of the stator". In the example which will be described, the stator 2 is supplied with current by an electrical power supply device 7. The power supply device 7 may be any electrical network. In the example considered, the power supply device 7 delivers a three-phase current to the stator 2.

In the examples represented, the coils $6_j$ of the stator 2 are tooth-coiled but the invention also applies to a stator with distributed coiling.

Furthermore, the examples described relate to a machine with radial flux and with internal rotor but the invention can also apply to a machine with axial flux and/or with external rotor.

As may be seen in FIG. 1, the coils $6_j$ may be distributed in a uniform manner around the perimeter of the axis X, that is to say the angular separation $\theta_{j,j+1}$ between the coils $6_j$ and $6_{j+1}$ is substantially constant around the perimeter of the stator, the coils $6_j$ and $6_{j+1}$ designating two successive coils as one progresses around the axis X. The notation $\theta$ will be adopted in such a case of uniform distribution of the coils $6_j$.

In the example of FIG. 1, the angular separation $\theta$ equals $2\Pi/6$. The coil $6_1$ is considered to be the reference coil. The phase of the current $i_1$ traversing the latter and specific to the latter is then arbitrarily fixed as zero. The stator 2 of the electric machine 1 is connected to the power supply device 7 in such a way that as one progresses around the axis X, starting from the coil $6_1$, there is found in succession:
- the coil $6_2$, which is shifted with respect to the coil $6_1$ by $2\Pi/6$, is traversed by a current $i_2$ of $+2\Pi/6$, respectively of $-2\Pi/6$, with respect to the current $i_1$,
- the coil $6_3$, which is shifted with respect to the coil $6_2$ by $2\Pi/6$, is traversed by a current $i_3$ phase-shifted by $+4\Pi/6$, respectively by $-4\Pi/6$, with respect to the current $i_1$,
- the coil $6_4$, which is shifted with respect to the coil $6_3$ by $2\Pi/6$, that is to say by $\Pi$ with respect to the coil $6_1$, is traversed by a current $i_4$ phase-shifted by $\Pi$ with respect to the current $i_1$,
- the coil $6_5$, which is shifted with respect to the coil $6_4$ by $2\Pi/6$, is traversed by a current $i_5$ phase-shifted by $+8\Pi/6$, respectively by $-8\Pi/6$, with respect to the current $i_1$, and
- the coil $6_6$, which is shifted with respect to the coil $6_5$ by $2\Pi/6$, is traversed by a current $i_6$ phase-shifted by $+10\Pi/6$, respectively by $-10\Pi/6$, with respect to the current $i_1$.

It is thus noted that in the example of FIG. 1, the phase shift between the current $i_1$ and the currents $i_j$ varies in a strictly monotonic manner (modulo $2\Pi$) as the order j of the coils varies from 1 to 6. Coils which are diametrically opposite with respect to the axis X are traversed by currents in phase opposition in the example considered. Still in the example considered, the currents $i_1$ to $i_6$ have the same amplitude. These diametrically opposite coils are arranged in the example of FIG. 1 facing poles of the rotor 3 of like polarity.

An exemplary use of a stator configured according to the invention will now be described with reference to FIGS. 2 to 4.

The rotating electric machine 1 may be integrated into a sub-assembly 20 of an electric vehicle. This sub-assembly 20 comprises in the example of FIGS. 2 and 3 a connector 21 configured so as to be linked to the electrical power supply device 7, a converter 22 and a capacitor 23 mounted in parallel across the terminals of a battery, not represented. If appropriate, a DC/DC converter may be arranged between the converter 22 and the battery.

The converter 22 comprises switches which can each comprise a power transistor across the terminals of which is mounted a diode in parallel. The switches are for example arranged according to H bridges. In the case of a three-phase current supply with a three-phase stator 2, the converter comprises for example three H bridges. Each H bridge can then comprise two arms each having two breaker switches such as described hereinabove and each terminal of a winding forming a phase of the stator may be connected between two breaker switches of an arm of a bridge.

The converter 22 is configured in such a way that:
- when the rotating electric machine 1 drives the vehicle, the converter plays the role of inverter to power the machine 1 from the battery and
- when the battery is being charged, for example from the electrical power
supply device 7, the converter 22 plays the role of rectifier to charge the battery with DC current.

In the above two modes of operation of the converter 22, the latter determines the form of the currents $i_j$ according to a predetermined strategy.

When the converter 22 comprises H bridges, the latter may be controlled according to the teaching of patent application WO 2010/057892 already cited.

The sub-assembly 20 of FIGS. 2 and 3 uses the windings of the stator 2 during the charging of the battery and the switches of the converter 22 but, in other examples, a specific charger could be provided.

As may be seen in FIGS. 2 and 3, six coils $6_j$ are arranged on the carcass 5 of the stator. Each coil possesses a current input for power supply by the device 7 which is common to another coil. In the example considered, these two coils having a common current input form the winding corresponding to an electrical phase of the stator 2. In the example of FIG. 2, the winding of each phase of the stator is supplied at its midpoint, that is to say the two coils having a common current input have the same number of turns and the currents $i_U$, $i_V$ and $i_W$ powering respectively the stator phases linked to the phases U, V and W of the power supply device 7 are divided in two upon their input into the stator 2, one half $i_{Ul}$, $i_{Vl}$ or $i_{Wl}$ of this current flowing around one coil while the other half $i_{Ur}$, $i_{Vr}$ and $i_{Wr}$ flows around another coil. These coils having a common current input in current will thereafter be called "coil" and "complementary or dual coil" and these two coils form a "coil/dual coil" pair.

In the example described, the terminals of the winding forming each phase of the stator may be respectively arranged between two switches of an arm of an H bridge while the midpoint of this winding is connected to the power supply device 7. The electrical diagram of the sub-assembly 20 of the electric vehicle is for example the same as that of FIG. 5 of patent application WO 2010/057892 which is incorporated into the present application by reference.

As may be seen in FIG. 3, the coils of a pair may be traversed by currents of like intensity but in phase opposition.

The way in which the coils of the stator 2 may be connected to the power supply device 7 will now be explained with reference to FIG. 4.

As may be seen in this FIG. 4, there exist eight ways of connecting the six coils $6_j$ arranged on the carcass of the stator to the device 7 when it is sought that the coils forming a "coil/dual coil" pair which are traversed by currents in phase opposition be diametrically opposite with respect to the axis X.

Without the latter condition, as soon as one of the coils has been connected to the power supply device 7, there exist 120 different ways of connecting the other coils $6_j$ to the power supply device 7. According to the invention, it is sought that the order of the currents $i_j$ in the coils $6_j$ should vary in a strictly monotonic manner as one progresses around the axis X of the stator.

As may be seen, the currents $i_{Ul}$, $i_{Vl}$ and $i_{Wl}$ are mutually phase-shifted by $2\Pi/3$, just as the currents $i_{Ur}$, $i_{Vr}$ and $i_{Wr}$ are mutually phase-shifted by the same value of angle. Moreover, the phase shift between the currents $i_{Ul}$ and $i_{Ur}$, respectively between the currents $i_{Vl}$ and $i_{Vr}$, respectively between the currents $i_{Wl}$ and $i_{Wr}$, is equal to $\Pi$.

If the coils $6_j$ of the stator are linked to the power supply device 7 according to the "C" configuration of FIG. 4, on considering that the coil $6_1$, which is linked so as to be supplied by the current $i_{Ul}$, is the reference coil for the phase shift of the current, the following coils and currents are found in succession as one progresses around the axis X from the reference coil $6_1$:

the coil $6_2$ supplied by the current $i_{Vr}$ phase-shifted by $2\Pi/6$ with respect to $i_{Ul}$, the coil $6_3$ supplied by the current $i_{Wl}$ phase-shifted by $4\Pi/6$ with respect to $i_{Ul}$, coil $6_4$ supplied by the current $i_{Ur}$ phase-shifted by $\Pi$ with respect to $i_{Ul}$ coil $6_5$ supplied by the current $i_{Vl}$ phase-shifted by $8\Pi/6$ with respect to $i_{Ul}$, and coil $6_6$ supplied by the current $i_{Wr}$ phase-shifted by $10\Pi/6$ with respect to $i_{Ul}$.

Successive coils $6_j$ are thus obtained, angularly shifted by $2\Pi/6$ and such that the phase shift between the current traversing the reference coil and the current traversing each of the other coils and specific to the latter varies in a strictly monotonic manner and, in the example described in a regular manner, as one progresses around the axis X.

It is noted by observing FIG. 4 that the "G" configuration also makes it possible to obtain the desired relation between arrangement of the coils and variation of the phase shift of the currents traversing them.

When the stator according to the "C" or "G" configuration is associated with a rotating electric machine rotor 3 whose diametrically opposite poles are of like polarity, the forces generated in the coils of a pair which are, according to these configurations, traversed by currents in phase opposition and which are diametrically opposite with respect to the axis of the stator compensate one another, so that although the stator is electrically powered, the rotor does not rotate. It is thus possible to charge the battery by using the components of the sub-assembly 20 without it being necessary to prevent the movements of the rotor.

The control of the currents flowing around the windings of the stator of such a machine may be facilitated. With such a stator, it is for example possible to employ mathematical tools such as Park transforms or Concordia transforms or the generalized Park transform when working on the matrix equations linking the current traversing each coil and specific to the latter and the voltage across the terminals of each coil.

The matrix of the inductances obtained with the aid of these equations can in particular exhibit good circularity which is propitious to the use of these mathematical transforms. In the case of a three-phase power supply, the use of such mathematical tools can simplify the implementation of a command ensuring the charging of the battery with DC current with at the input of the inverter and at the output of the motor of the sub-assembly 20 three sinusoidal currents in phase with the voltages delivered by the electrical power supply device 7 (this command is also called "operation by Power Factor Corrector").

As a variant, the stator according to the "C" or "G" configuration is associated with a rotating electric machine rotor 3 whose diametrically opposite poles are of inverse polarity. In this case, the forces generated in the coils of a "coil/dual coil" pair which are, according to these "C" or "G" configurations, traversed by currents in phase opposition and which are diametrically opposite with respect to the axis of the stator, add together, so that the rotor 3 rotates.

The invention is not limited to the examples which have just been described. The invention can for example apply with an electrical power supply device 7 comprising an arbitrary number of phases and with a rotating electric machine having an arbitrary number of phases. The expression "comprising a" must be understood as signifying "comprising at least one", except when the contrary is specified.

The invention claimed is:

1. A method of configuring a rotating electric machine stator, comprising:
   employing the rotating electric machine stator having a carcass on which electrical conductors are coiled to form N coils, N being greater than or equal to four and;
   electrically connecting the N coils to an electrical power supply device so that each coil is traversed by a specific electric current delivered by the electrical power supply device,
      the connection of the stator to the electrical power supply device being performed so that as one progresses around an axis of the stator away from a reference coil, the phase shift between a current traversing the reference coil and the current specific to each of the other coils varies in a strictly monotonic manner as one progresses away from the reference coil.

2. The method according to claim 1, in which the N coils are distributed in a uniform manner around the axis of the stator and in which the phase shift of the current varies in a regular manner between successive coils.

3. The method according to claim 2, in which two successive coils are shifted angularly by a mechanical angle substantially equal to $2\cdot k\cdot\Pi/N$ and the two successive coils are powered by currents mutually phase-shifted by an electrical angle substantially equal to $2\cdot k\cdot\Pi/N$, k being a relative integer.

4. The method according to claim 1, wherein each current delivered by the power supply device has a same amplitude.

5. The method according to claim 1, wherein the electrical power supply device delivers a three-phase current and is connected to the N coils of the stator in such a way that each coil has an input in current from the power supply device which is common with another coil of the stator, the other coil forming a coil complementary to the corresponding coil.

6. The method according to claim 5, in which the coiling and the connection of the N coils make it so that the corresponding coil and the complementary coil are diametrically opposite with respect to the axis of the stator and are traversed by currents phase-shifted by an electrical angle equal to $\Pi$.

7. The method according to claim 6, wherein the corresponding coil forms a first part of a winding of a phase of the stator while the complementary coil forms a second part distinct from the first part of the winding of the phase.

8. The method according to claim 7, wherein the current input of the winding of the phase of the stator is arranged substantially at a midpoint of the winding.

9. The method according to claim 1, wherein the rotating electric machine is a synchronous machine.

10. The method according to claim 1, wherein the electrical power supply device is an electrical network that is connected to the N coils of the stator without an intermediate voltage converter.

11. A method of charging a battery from an electrical power supply device with aid of a rotating electric machine, in which:
   a stator of the rotating electric machine is configured by applying the method according to claim 1; and
   the battery is charged by using the N coils of the stator, the currents having flowed in said coils being rectified before charging the battery.

12. The method according to claim 11, wherein
   each coil has an input in current from the power supply device which is common with another coil of the stator, the other coil forming a coil complementary to the corresponding coil,
   the corresponding coil forms a first part of a winding of a phase of the stator while the complementary coil forms a second part distinct from the first part of the winding of the phase, and
   wherein the current input of the winding of the phase of the stator is arranged substantially at a midpoint of the winding.

13. The method of claim 11, wherein the rotating electric machine comprises a rotor configured so that the rotor is stationary or rotates when the coils of the stator are supplied with current so as to recharge the battery.

14. A system, comprising:
   a rotating electric machine stator, comprising a carcass and electrical conductors coiled on the carcass to form N coils, N being greater than or equal to four, and
   an electrical power supply device delivering a specific electric current to each coil,
   wherein a connection of the stator to the electrical power supply device is made such that as one progresses around an axis of the stator away from a reference coil, a phase shift between a current traversing the reference coil and the current specific to each of the other coils varies in a strictly monotonic manner as one progresses away from the reference coil.

15. The system according to claim 14, two successive coils being, as one progresses around the axis of the stator, shifted angularly by a mechanical angle substantially equal to $2\cdot k\cdot\Pi/N$, and the two successive coils being connected to the electrical power supply device to be respectively powered by currents mutually phase-shifted by an electrical angle substantially equal to $2\cdot k\cdot\Pi/N$, k being a relative integer.

* * * * *